United States Patent
Zheng et al.

(10) Patent No.: US 12,554,530 B2
(45) Date of Patent: Feb. 17, 2026

(54) METHOD AND APPARATUS FOR OPTIMIZING SERVER SYSTEM INTERRUPTS, DEVICE AND MEDIUM

(71) Applicant: SUZHOU METABRAIN INTELLIGENT TECHNOLOGY CO., LTD., Jiangsu (CN)

(72) Inventors: Junfei Zheng, Jiangsu (CN); Minggang Ren, Jiangsu (CN); Ruizhen Wu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 92 days.

(21) Appl. No.: 18/721,358

(22) PCT Filed: Sep. 15, 2022

(86) PCT No.: PCT/CN2022/118850
§ 371 (c)(1),
(2) Date: Jun. 18, 2024

(87) PCT Pub. No.: WO2023/197521
PCT Pub. Date: Oct. 19, 2023

(65) Prior Publication Data
US 2025/0036453 A1    Jan. 30, 2025

(30) Foreign Application Priority Data
Apr. 13, 2022   (CN) .......................... 202210381524.4

(51) Int. Cl.
G06F 13/24     (2006.01)
G06F 9/4401    (2018.01)
G06F 9/48      (2006.01)

(52) U.S. Cl.
CPC .......... *G06F 9/4812* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 5,390,329 | A * | 2/1995 | Gaertner | G06F 8/45 |
| | | | | 714/E11.21 |
| 6,185,640 | B1 * | 2/2001 | Ross | G06F 3/0626 |
| | | | | 710/52 |

(Continued)

FOREIGN PATENT DOCUMENTS

| | | |
|---|---|---|
| CN | 102246524 A | 11/2011 |
| CN | 106339297 A | 1/2017 |

(Continued)

OTHER PUBLICATIONS

International Search Report published with related International Application PCT/CN2022/118850, Dec. 30, 2022.

(Continued)

Primary Examiner — Hyun Nam
(74) Attorney, Agent, or Firm — Merchant & Gould P.C.

(57) ABSTRACT

Disclosed are a method and apparatus for optimizing server system interrupts, a device and a medium, which relate to the field of servers. The method is applied to a server system, and comprises: when a peripheral driver of a kernel space monitors an interrupt request signal sent by a hardware peripheral, reading a hardware event queue in the hardware peripheral, so as to acquire a target hardware event in the hardware event queue; then, converting the target hardware event into a target software event by using the peripheral driver, and writing the target software event into a preset global event queue; reading the target software event in the global event queue by means of a user space, and forwarding (Continued)

the target software event to a corresponding target service process by means of the user space, such that the target service process processes the target. In this way, by using hardware interrupt coalescing and software event coalescing techniques, this solution may not only reduce the interrupt processing overhead, but also reduce the processor utilization.

20 Claims, 7 Drawing Sheets

(56) References Cited

U.S. PATENT DOCUMENTS

| | | | |
|---|---|---|---|
| 7,752,370 B2 | 7/2010 | Ma | |
| 9,378,047 B1 | 6/2016 | Gould et al. | |
| 2005/0177657 A1* | 8/2005 | Pope | G06F 13/385 710/36 |
| 2006/0077946 A1* | 4/2006 | Adya | H04W 24/04 370/349 |
| 2007/0030859 A1* | 2/2007 | Pope | G06F 13/24 370/463 |
| 2008/0201500 A1 | 8/2008 | Zytaruk et al. | |
| 2013/0024875 A1* | 1/2013 | Wang | G06F 9/542 719/318 |
| 2014/0129751 A1* | 5/2014 | Cho | G06F 13/24 710/260 |
| 2019/0026220 A1* | 1/2019 | Lee | G06F 3/0611 |
| 2021/0097012 A1* | 4/2021 | Cai | G06F 9/546 |
| 2021/0279097 A1 | 9/2021 | Vijay et al. | |
| 2022/0318169 A1* | 10/2022 | Venkataramani | G06F 13/22 |
| 2022/0414035 A1* | 12/2022 | Bai | G06F 3/061 |
| 2025/0036453 A1* | 1/2025 | Zheng | G06F 9/542 |

FOREIGN PATENT DOCUMENTS

| | | |
|---|---|---|
| CN | 108628782 A | 10/2018 |
| CN | 109218227 A | 1/2019 |
| CN | 111133417 A | 5/2020 |
| CN | 112470125 A | 3/2021 |
| CN | 114461371 A | 5/2022 |

OTHER PUBLICATIONS

Chinese Search Reports issued in corresponding Chinese Application No. CN 2022103815244, two separate search reports, Apr. 13, 2022.

* cited by examiner

METHOD AND APPARATUS FOR OPTIMIZING SERVER SYSTEM INTERRUPTS, DEVICE AND MEDIUM

CROSS-REFERENCE TO RELATED APPLICATION

The present disclosure is a National Stage Filing of the PCT International Present disclosure No. PCT/CN2022/118850 filed on Sep. 15, 2022, which claims priority to Chinese patent application no. 202210381524.4, filed with the Chinese Patent Office on Apr. 13, 2022 and entitled "Method and Apparatus for Optimizing Server System Interrupts, Device and Medium", which is incorporated herein by reference in its entirety.

TECHNICAL FIELD

The present disclosure relates to the technical field of servers, and in particular, to a method and apparatus for optimizing server system interrupts, a device and a medium.

BACKGROUND

A software and hardware cooperative design is a design method that combining software and hardware. The method makes full use of the parallelism of a hardware circuit and the flexibility of software, divides service functions according to the characteristics of processing flows, delivers modules suitable for parallel execution and substantially unrelated to services to hardware for implementation to improve the transmission performance and reduce the utilization of processors, and delivers modules suitable for serial execution and having large differences in different service flows to software for implementation to compile specific software processing flows according to actual services.

In the related art, interrupt is a method for hardware to notify software that a certain operation is completed or abnormal so as to implement software and hardware synchronization, and common interrupt modes include Message Signaled Interrupt (MSI), MSI-X, level interrupt, etc. However, when there are a large number of hardware peripherals of a server, high frequency of interrupts may be caused to the server system, which may cause a large software context switching overhead to the server system.

In the related art, there is also a polling working mode for a system processor, in this mode, a hardware device register and a physical memory of a kernel space are generally mapped to a user space by means of a memory mapping interface of a virtual file system of an operating system; in the user space of an operating system, a hardware device is initialized and data transmission is started; whether a hardware data transmission operation is completed is determined by polling a hardware state register; and when the hardware data transmission operation is completed, the next round of data transmission is continuously started. Because no interrupt is introduced in the method completely, context switching overhead caused by system interrupt processing may be reduced. However, the utilization of system processors is high, and the system response timeliness is poor.

It may be seen from the above that, in the process of cooperative use of software and hardware, how to avoid the situations of high interrupt processing overhead in a pure interrupt mode and high utilization of processors in a pure polling mode is a problem to be solved in the art.

SUMMARY

According to a first aspect, the present disclosure discloses a method for optimizing server system interrupts, wherein the method is applied to a server system, and includes:
when a peripheral driver of a kernel space monitors an interrupt request signal sent by a hardware peripheral, a hardware event queue in the hardware peripheral is read, so as to acquire a target hardware event in the hardware event queue, wherein the interrupt request signal is a signal sent to the kernel space after being generated by the hardware peripheral upon determining that a preset interrupt request signal sending rule is satisfied;
the target hardware event is converted into a target software event by using the peripheral driver, and the target software event is written into a preset global event queue; and
the target software event in the global event queue is read by means of a user space, and the target software event is forwarded to a corresponding target service process by means of a user space, such that the target service process processes the target software event.

In some exemplary embodiments, the method for optimizing server system interrupts further includes:
a semaphore mechanism is set for a character device driver of the kernel space, and a current signal value of the character device driver is set as a signal value for representing that a current process state of the target service process is a blocked state;
correspondingly, after the target software event is written into the preset global event queue, the method further includes:
when the character device driver detects that the target software event is written into the global event queue, the current signal value of the character device driver is switched to a signal value for representing that the current process state is a non-blocked state, and then the blocked state of the target service process is released.

In some exemplary embodiments, after the semaphore mechanism is set for the character device driver of the kernel space, and the current signal value of the character device driver is set as the signal value for representing that the current process state is the blocked state, the method further includes:
a file control interface of the character device driver of the kernel space is called, and the running of an event forwarding module of the user space is blocked by means of the semaphore mechanism according to the signal value for representing that the current process state is the blocked state, such that the event forwarding module is switched into a blocked state for waiting event; wherein the event forwarding module is used for reading the target software event, and forwarding the target software event to the corresponding target service process;
the operation that when the character device driver detects that the target software event is written into the global event queue, the signal value of the current character device driver is switched to the signal value for representing that the current process state is the non-blocked state, and then the blocked state of the target service process is released includes:
when the character device driver detects that the target software event is written into the global event queue, the current signal value of the character device driver is switched to the signal value for representing that the current process state is the non-blocked state, and the blocked state of the event forwarding module is released according to the signal value for representing that the current process state is the non-blocking state, such that the event forwarding module reads the target software event, and forwards the target software event to the corresponding target service process.

In some exemplary embodiments, after the blocked state of the event forwarding module is released according to the signal value for representing that the current process state is the non-blocking state, the method further includes:

after the event forwarding module completes the forwarding of all software event information of the target software event, the file control interface of the character device driver of the kernel space is re-called, and by means of the semaphore mechanism, the event forwarding module is re-controlled to enter the blocked state.

In some exemplary embodiments, after the blocked state of the target service process is released, the method further includes:

a kernel event for representing that the blocked state of the target service process is released is sent to the user space by using the character device driver;

correspondingly, the operation that the target software event in the global event queue is read by means of the user space includes:

the kernel event sent by the character device driver is received by means of the user space, and then the target software event in the global event queue is read.

In some exemplary embodiments, a signal value of 0 in the character device driver indicates that the current process state is the blocked state, and a signal value of 1 indicates that the current process state is the non-blocked state.

In some exemplary embodiments, the operation that the target software event is forwarded to a corresponding target service process by means of a user space, such that the target service process processes the target software event includes:

a target event type of the target software event is determined;

based on a preset correlation between an event type and an event callback function linked list, a target event callback function linked list corresponding to the target software event is determined by using the target event type; and the corresponding target service process is determined by using the target event callback function linked list, and the target software event is forwarded to the target service process, such that the target service process processes the target software event.

In some exemplary embodiments, the method further includes:

event callback functions of one or more service processes are registered in the event callback function linked list; and the preset correlation between the event type and the event callback function linked list is generated after registration.

In some exemplary embodiments, the preset correlation between the event callback function linked list and the service process is a many-to-many mapping relationship.

In some exemplary embodiments, the operation that the target hardware event is converted into a target software event includes:

hardware event information of the target hardware event is converted into software event information of the target software event.

In some exemplary embodiments, the hardware event information includes operation completion information, operation exception information, and other exception information except the operation exception information, and the software event information includes one or more of a total information length, an event type, a priority, whether to broadcast, whether to shield, a check algorithm, hardware event data and a check field.

In some exemplary embodiments, the operation that the target software event in the global event queue is read by means of the user space includes:

a physical address of the global event queue in the character device driver is acquired;

the physical address is mapped to the user space to obtain a corresponding virtual address of the global event queue; and the target software event in the global event queue is read by means of the user space and by using the virtual address of the global event queue.

According to a second aspect, the present disclosure discloses a method for optimizing server system interrupts, wherein the method is applied to a hardware peripheral, and includes:

an interrupt event is acquired by means of a preset interrupt event receiving interface, and interrupt information is generated based on the interrupt event when the interrupt event is completed;

the interrupt information is added to a preset hardware event queue in an event form; and whether a preset interrupt request signal sending rule is satisfied is determined currently, and when the preset interrupt request signal sending rule is satisfied, an interrupt request signal is generated, and the interrupt request signal is sent to a kernel space of a server system, such that when a peripheral driver of the kernel space monitors the interrupt request signal, a target hardware event read from the hardware event queue is converted into a target software event, and the target software event is written into a preset global event queue by means of the server system, and then the target software event read from the global event queue is forwarded to a corresponding target service process by means of a user space for processing.

In some exemplary embodiments, the interrupt event is a hardware operation event, and the operation that interrupt information is generated based on the interrupt event when the interrupt event is completed includes:

after the hardware peripheral completes a corresponding hardware operation, corresponding interrupt information is generated.

In some exemplary embodiments, the operation that interrupt information is generated based on the interrupt event when the interrupt event is completed includes:

when a device exception of the hardware peripheral or an operation exception of a hardware operation corresponding to the interrupt event occurs, corresponding interrupt information is generated.

In some exemplary embodiments, the operation that whether a preset interrupt request signal sending rule is satisfied is determined currently, and when the preset interrupt request signal sending rule is satisfied, the interrupt request signal is generated includes:

a time difference between the current time and the last time when the interrupt request is sent is calculated, and the time difference is taken as a current interrupt interval;

whether the current interrupt interval is not less than a preset minimum interrupt interval is determined;

when the current interrupt interval is not less than the minimum interrupt interval, whether the hardware event queue is not empty is determined; and when the hardware event queue is not empty, the interrupt request signal is generated.

In some exemplary embodiments, after the interrupt request signal is generated, the method further includes:

the interrupt request signal is sent, and the last interrupt event is updated.

According to a third aspect, the present disclosure discloses an apparatus for optimizing server system interrupts, wherein the apparatus is applied to a server system, and includes:

an event acquiring module, configured to, when a peripheral driver of a kernel space monitors an interrupt request signal sent by a hardware peripheral, read a hardware event queue in the hardware peripheral, so as to acquire a target hardware event in the hardware event queue, wherein the interrupt request signal is a signal sent to the kernel space after being generated by the hardware peripheral upon determining that a preset interrupt request signal sending rule is satisfied;

an event writing module, configured to convert the target hardware event into a target software event by using the peripheral driver, and write the target software event into a preset global event queue; and an event processing module, configured to read the target software event in the global event queue by means of a user space, and forward the target software event to a corresponding target service process by means of the user space, such that the target service process processes the target software event.

According to a fourth aspect, the present disclosure discloses an electronic device, comprising a memory and one or more processors, wherein the memory stores computer readable instructions which, when executed by the one or more processors, cause the one or more processors to execute the operations of the method for optimizing server system interrupts.

According to a fifth aspect, the present disclosure discloses a non-transitory computer readable storage medium storing one or more computer readable instructions, wherein the computer readable instructions, when executed by one or more processors, cause the one or more processors to execute the operations of the method for optimizing server system interrupts.

BRIEF DESCRIPTION OF THE DRAWINGS

To describe the technical solutions in the embodiments of the present disclosure or in the related art more clearly, the following briefly introduces the drawings required for description in the embodiments or the related art. Apparently, the drawings in the following description show merely some embodiments of the present disclosure, and a person of ordinary skill in the art may still derive other drawings from the provided drawings without inventive efforts.

DETAILED DESCRIPTION OF THE EMBODIMENTS

The following clearly and completely describes the technical solutions in the embodiments of the present disclosure with reference to the drawings in the embodiments of the present disclosure. Apparently, the described embodiments are merely some rather than all of the embodiments of the present disclosure. All other embodiments obtained by a person of ordinary skill in the art based on the embodiments of the present disclosure without inventive efforts shall belong to the scope of protection of the present disclosure.

In the related art, the pure interrupt mode has a high overhead for interrupt processing, and the pure polling mode has a high utilization for processors. The present disclosure proposes a method using hardware interrupt coalescing and software event coalescing, which may not only reduce the interrupt processing overhead, but also reduce the processor utilization.

Figure 1:
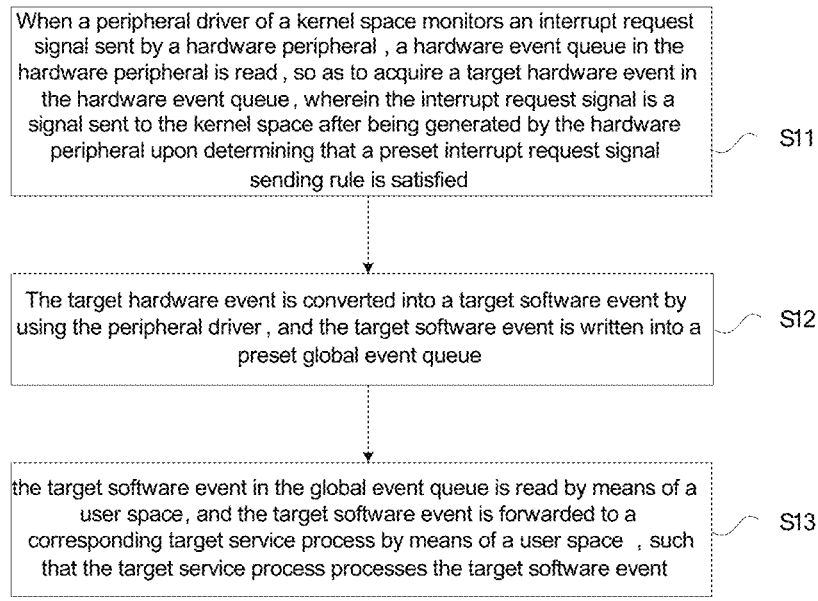
FIG. 1 is a flowchart of a method for optimizing server system interrupts provided in one or more embodiments of the present disclosure.

Disclosed in the embodiments of the present disclosure is a method for optimizing server system interrupts, which is applied to a server system. As shown in FIG. 1, the method includes:

At operation S11: when a peripheral driver of a kernel space monitors an interrupt request signal sent by a hardware peripheral, a hardware event queue in the hardware peripheral is read, so as to acquire a target hardware event in the hardware event queue, wherein the interrupt request signal is a signal sent to the kernel space after being generated by the hardware peripheral upon determining that a preset interrupt request signal sending rule is satisfied.

It may be understood that the server system includes a user space and a kernel space, the peripheral driver is located in the kernel space, a hardware event queue is stored in the hardware peripheral, a target hardware event is stored in the hardware event queue, and the target hardware event is an event to be processed in the hardware event queue. Further, in this operation, the hardware peripheral generates the interrupt request signal after a preset interrupt request signal sending rule is satisfied, and when the peripheral driver in the kernel space in the server system monitors the interrupt request signal sent by the hardware peripheral, the hardware event queue in the hardware peripheral is read, so as to acquire the target hardware event in the hardware event queue.

At operation S12: the target hardware event is converted into a target software event by using the peripheral driver, and the target software event is written into a preset global event queue.

Figure 2:
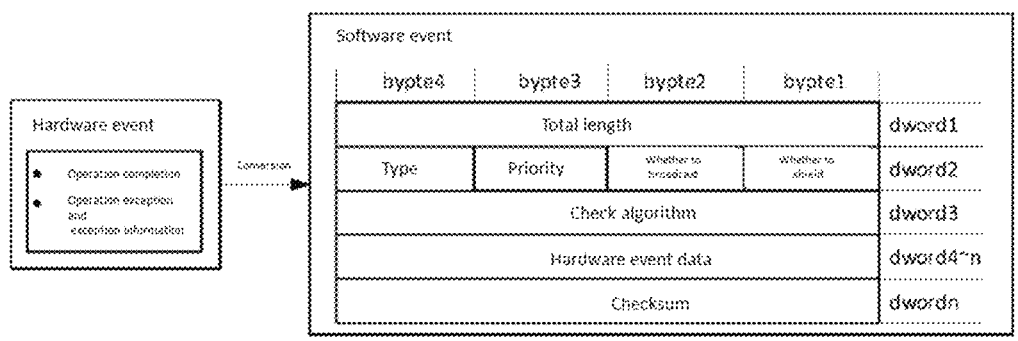
FIG. 2 is a schematic diagram of conversion between software and hardware events provided in one or more embodiments of the present disclosure.

In a specific implementation, in this embodiment, the process of converting the target hardware event into the target software event may adopt a manner of converting hardware event information into software event information, so as to control the hardware event in a finer granularity. FIG. 2 is a schematic diagram of conversion between software and hardware events. The hardware event includes operation completion information, operation exception information, and other exception information, and the software event information includes a total information length, an event type, a priority, whether to broadcast, whether to shield, a check algorithm, hardware event data and a field such as checksum.

In this embodiment, the method for optimizing server system interrupts may further include: a semaphore mechanism is set for a character device driver of the kernel space, and a current signal value of the character device driver is set as a signal value for representing that a current process state of the target service process is a blocked state; correspondingly, after the target software event is written into the preset global event queue, the method may further include: when the character device driver detects that the target software event is written into the global event queue, the current signal value of the character device driver is switched to a signal value for representing that the current process state is a non-blocked state, and then the blocked state of the target service process is released.

In this embodiment, the semaphore mechanism is established for the character device driver in the kernel space. In a specific implementation, the event forwarding module for event reading and forwarding may be added in the user space, and the user space may call the file control interface of a virtual file system in the kernel space, further convert it into a file control interface for calling the character device driver in the kernel space, and block the running of the event forwarding module in the user space by means of the semaphore mechanism, such that the event forwarding module is switched to the blocked state of a waiting event; when an event is written into the global event queue of the kernel space is detected, the blocked state of the event forwarding module in the user space is released, such that the event forwarding module continues running; after the event forwarding module completes the forwarding of all software event information, the file control interface of the virtual file system in the kernel space is re-called, it is further converted into calling of the file control interface of the character device driver in the kernel space, and by means of the semaphore mechanism, the event forwarding module re-enters the blocked state. In a possible implementation, a signal value of 0 in the character device driver indicates that the current process state is a blocked state; and a signal value of 1 indicates that the current process state is a non-blocked state.

At operation S13: the target software event in the global event queue is read by means of a user space, and the target software event is forwarded to a corresponding target service process by means of a user space, such that the target service process processes the target software event.

In this embodiment, after the blocked state of the target service process is released, the method may further include: a kernel event for representing that the blocked state of the target service process is released is sent to the user space by using the character device driver; correspondingly, the operation that the target software event in the global event queue is read by means of the user space includes: the kernel event sent by the character device driver is received by means of the user space, and then the target software event in the global event queue is read.

It may be understood that the kernel event is an event for representing that the blocked state of the target service process is released. After the kernel event sent by the character device driver is received in the user space, it indicates that the process is in a non-blocked state, and then the target software event in the global event queue may be read and forwarded.

In this embodiment, the operation that the target software event in the global event queue is read by means of the user space may include: a physical address of the global event queue in the character device driver is acquired; the physical address is mapped to the user space to obtain a corresponding virtual address of the global event queue; and the target software event in the global event queue is read by means of the user space and by using the virtual address of the global event queue.

In a specific implementation, when the event forwarding module in the user space is in an initialization phase, a memory mapping interface of the virtual file system in the kernel space is called, and it is further converted into calling of a memory mapping interface of the character device driver in the kernel space, and the physical address of the global event queue in the kernel space is mapped to the virtual address of the "event forwarding module" in the user space, and when an event is forwarded, a target software event in the global event queue is read by using the virtual address, and the target software event is forwarded to a corresponding service process.

In this embodiment, a target software event is read from the global event queue by using the event forwarding module in the user space, and the target software event is forwarded to a corresponding service process, which embodies the software event coalescing function in the present disclosure.

In this embodiment, when a peripheral driver of a kernel space monitors an interrupt request signal sent by a hardware peripheral, a hardware event queue in the hardware peripheral is read, so as to acquire a target hardware event in the hardware event queue, wherein the interrupt request signal is a signal sent to the kernel space after being generated by the hardware peripheral upon determining that a preset interrupt request signal sending rule is satisfied; the target hardware event is converted into a target software event by using the peripheral driver, and the target software event is written into a preset global event queue; a target software event in the global event queue is read by means of a user space, and the target software event is forwarded to a corresponding target service process by means of a user space, such that the target service process processes the target software event. In this way, after receiving the interrupt request signal generated by the hardware peripheral after the preset interrupt request signal sending rule is satisfied, a server system reads a target hardware event in the hardware peripheral, converts same into a target software event which is convenient for the system to process, and finally forwards the target software event to a target service process for processing. By means of hardware interrupt coalescing and software event coalescing techniques, this method may not only reduce the interrupt processing overhead, but also reduce the processor utilization.

Figure 3:
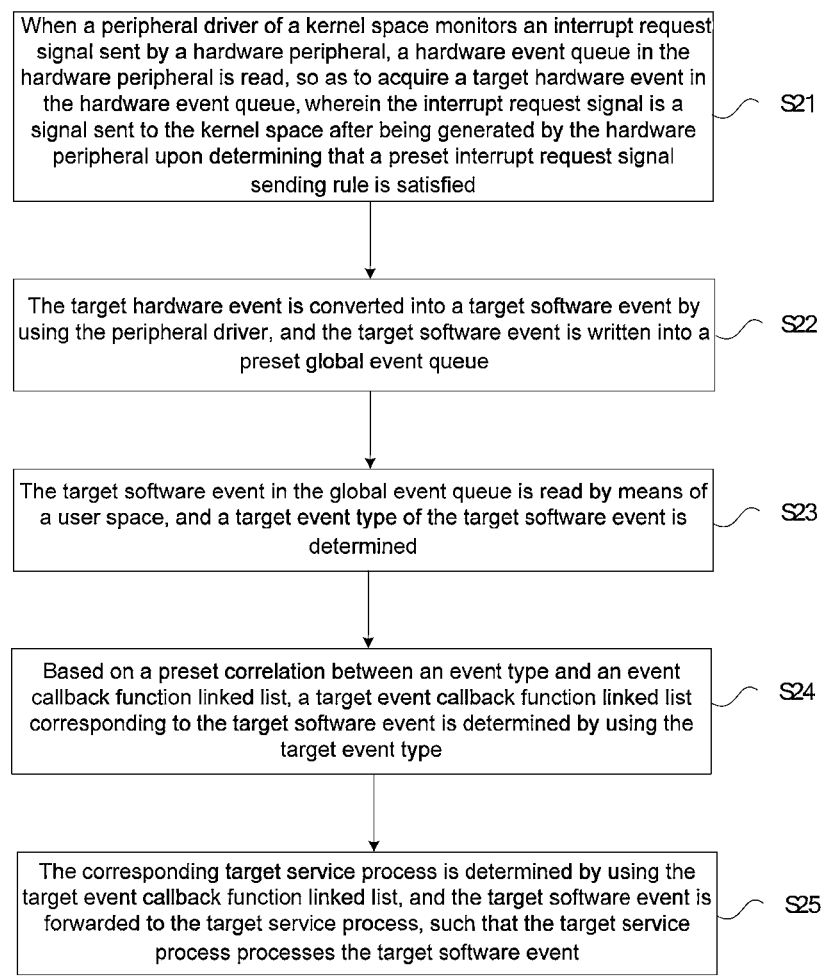
FIG. 3 is a flowchart of a specific method for optimizing server system interrupts provided in one or more embodiments of the present disclosure.

FIG. 3 is a flowchart of a specific method for optimizing server system interrupts provided in one or more embodiments of the present disclosure, wherein the method is applied to a server system. As shown in FIG. 3, the method includes:

At operation S21: when a peripheral driver of a kernel space monitors an interrupt request signal sent by a hardware peripheral, a hardware event queue in the hardware peripheral is read, so as to acquire a target hardware event in the hardware event queue, wherein the interrupt request signal is a signal sent to the kernel space after being generated by the hardware peripheral upon determining that a preset interrupt request signal sending rule is satisfied.

For a more specific processing procedure of operation S21, reference may be made to the corresponding content disclosed in the foregoing embodiment, and details are not described herein again.

At operation S22: the target hardware event is converted into a target software event by using the peripheral driver, and the target software event is written into a preset global event queue.

For a more specific processing procedure of operation S22, reference may be made to the corresponding content disclosed in the foregoing embodiment, and details are not described herein again.

At operation S23: the target software event in the global event queue is read by means of a user space, and a target event type of the target software event is determined.

It may be understood that, after acquiring a target software event by means of the user space, the target software event is forwarded to a corresponding target process. In this operation, a target event type of the target software event is determined first, and then a subsequent event forwarding procedure is completed according to the target software type.

Operation S24: based on a preset correlation between an event type and an event callback function linked list, a target event callback function linked list corresponding to the target software event is determined by using the target event type.

In this embodiment, a corresponding target event callback function linked list may be determined according to the event type of the target software event, a corresponding target service process may be determined according to a callback function in the target event callback function linked list, and the target software event is forwarded to the target service process for processing.

It should be noted that, when an event forwarding module in the user space is in an initialization phase, a global event and an event callback function linked list in the event forwarding module are defined, and at this time, each service process registers an event callback function of this module with the event callback function linked list, wherein the event callback function linked list and the service process module may be in a many-to-many mapping relationship, that is, one linked list may receive callback functions registered by a plurality of modules, one module may also register callback functions with a plurality of linked lists; and after the initialization phase ends, a correlation between the event type and the event callback function linked list and a correlation between the event callback function linked list and the service process are formed according to the registration process of the functions.

Operation S25: the corresponding target service process is determined by using the target event callback function linked list, and the target software event is forwarded to the target service process, such that the target service process processes the target software event.

In this embodiment, a corresponding target event callback function linked list may be determined according to the event type of the target software event, a corresponding target service process may be determined according to a callback function in the target event callback function linked list, and the target software event is forwarded to the target service process for processing.

Figure 4:
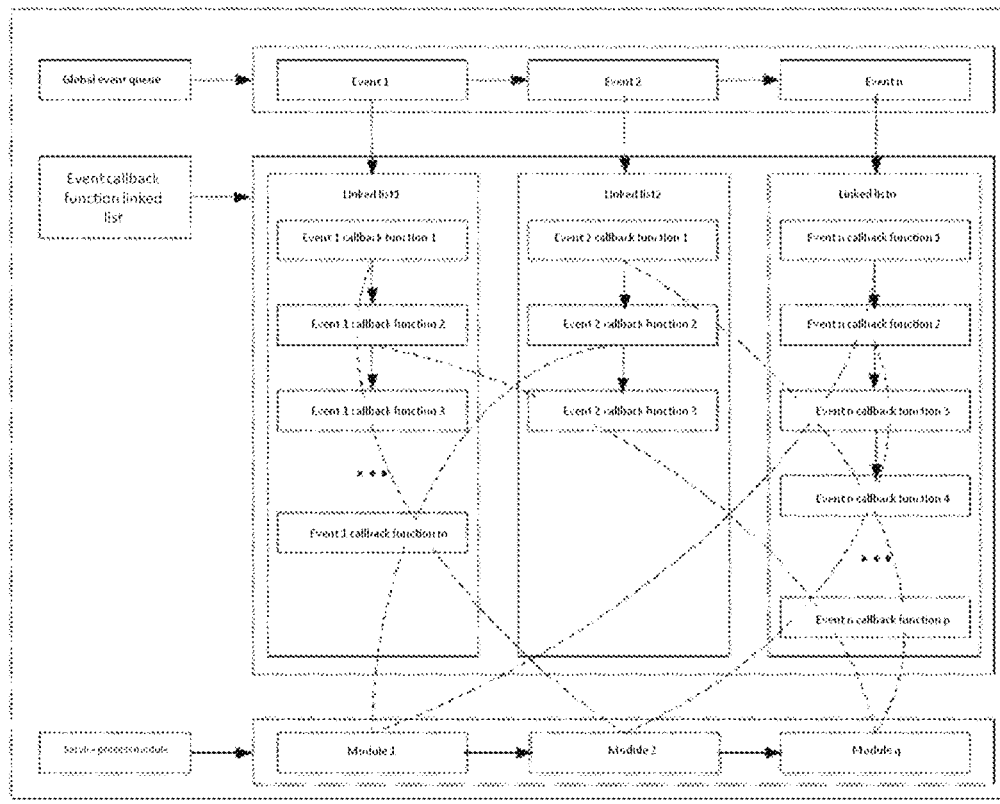
FIG. 4 is a schematic diagram of event registration provided in one or more embodiments of the present disclosure.

FIG. 4 is a schematic diagram of event registration proposed in the present disclosure. Dotted lines in FIG. 4 represent correlations between process modules and linked lists formed by registering event callback functions with each event callback function linked list when the service process modules are in an initialization phase. After a target event type of the target software event is acquired in operation S23, a target event callback function linked list corresponding to each target software event is determined according to a preset correlation between the event type and the event callback function linked list, and finally, a corresponding service process module is determined according to the event callback functions in the event callback function linked list, and the target software event is processed according to the corresponding service process.

In this embodiment, a target software event in the global event queue may be read by means of a user space, and a target event type of the target software event is determined, then a target event callback function linked list is determined according to the target event type of the target software event, and finally a corresponding service process module is determined according to the event callback functions in the event callback function linked list, and the target software event is processed according to the corresponding service process. By forwarding software events to all service processes at one time, this method reduces the number of times of context switching between the user space and the kernel space which is introduced when each service process independently acquires the software events from the kernel space, and further reduces the occupation of processors caused by context switching. The reduction of cache invalidation of processors caused by the reduction of the number of times of context switching also improves the data processing and transmission performance of a hardware peripheral; hardware interrupt coalescing and software event coalescing cause a decrease of the processor utilization, such that a server system may allocate more processor resources to other software and hardware modules, and therefore, compared with traditional solutions, the overall data processing and transmission performance of the server is higher; in addition, the server system may process the events in a more ordered manner, thereby improving the efficiency of the server system for event processing.

Figure 5:
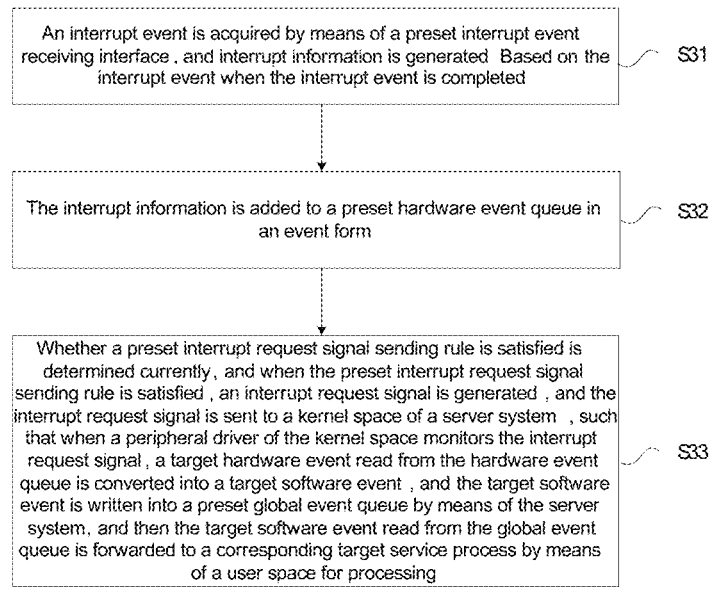
FIG. 5 is a flowchart of a specific method for optimizing server system interrupts provided in one or more embodiments of the present disclosure.

Disclosed in the embodiments of the present disclosure is another specific method for optimizing server system interrupts, which is applied to a hardware peripheral. As shown in FIG. 5, the method includes: At operation S31: an interrupt event is acquired by means of a preset interrupt event receiving interface, and interrupt information is generated based on the interrupt event when the interrupt event is completed.

It may be understood that, in this embodiment, an interrupt event may be acquired by means of a preset interrupt event receiving interface, wherein the interrupt event may be a hardware operation, and then after a hardware peripheral completes a corresponding hardware operation, corresponding interrupt information is generated. In another specific implementation, when a device exception of the hardware peripheral or an operation exception of a hardware operation corresponding to the interrupt event occurs, corresponding interrupt information may also be generated.

At operation S32: the interrupt information is added to a preset hardware event queue in an event form.

At operation S33: whether a preset interrupt request signal sending rule is satisfied is determined currently, and when the preset interrupt request signal sending rule is satisfied, an interrupt request signal is generated, and the interrupt request signal is sent to a kernel space of a server system, such that when a peripheral driver of the kernel space monitors the interrupt request signal, a target hardware event read from the hardware event queue is converted into a target software event, and the target software event is written into a preset global event queue by means of the server system, and then the target software event read from the global event queue is forwarded to a corresponding target service process by means of a user space for processing.

In this embodiment, the operation that whether a preset interrupt request signal sending rule is satisfied is determined currently, and when the preset interrupt request signal sending rule is satisfied, an interrupt request signal is generated includes: a time difference between the current time and the last time when the interrupt request is sent is calculated, and the time difference is taken as a current interrupt interval; whether the current interrupt interval is not less than a preset minimum interrupt interval is determined; when the current interrupt interval is not less than the minimum interrupt interval, whether the hardware event queue is not empty is determined; and when the hardware event queue is not empty, an interrupt request signal is generated.

It may be understood that, after the hardware peripheral sends the interrupt request signal to the server system, for a more specific processing procedure of the server system for the hardware event, reference may be made to the corresponding content disclosed in the foregoing embodiment, and details are not described herein again.

It needs to be pointed out that in the present solution, a preset minimum interrupt interval and a hardware queue are used to implement the coalescing technique of interrupt events in hardware. The present solution is applicable to multiple interrupts, including but not limited to MSI, MSI-X, and traditional interrupts. When there are multiple hardware peripherals in a system, all the hardware peripherals may provide an interrupt event coalescing flow similar to the described procedure.

Figure 6:
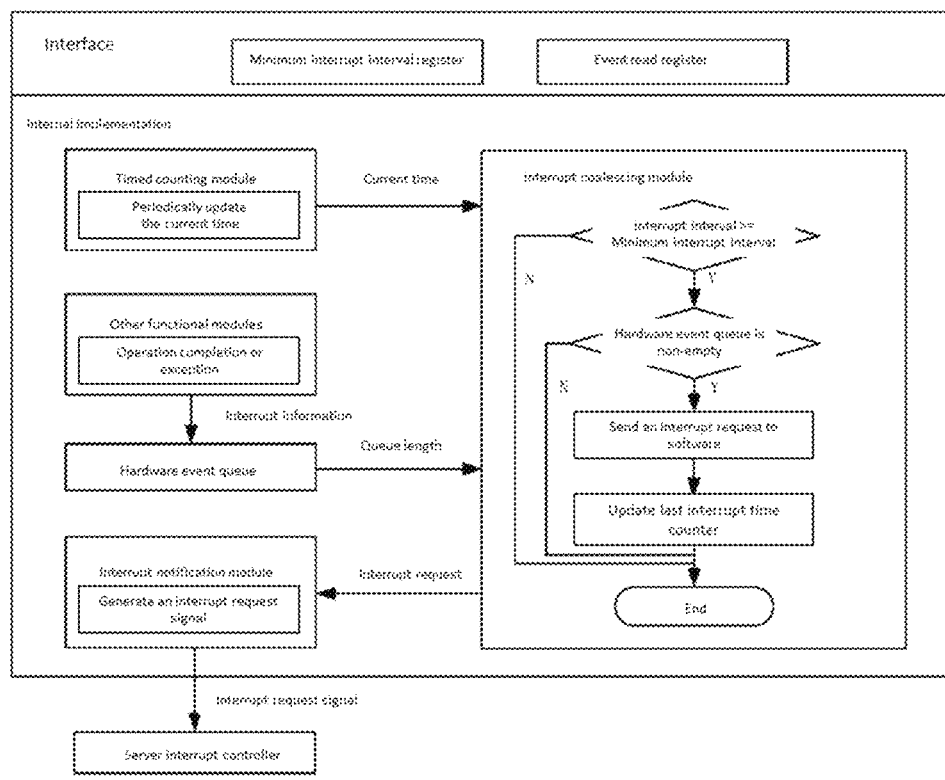
FIG. 6 is a flowchart of interrupt coalescing and interrupt request of a hardware peripheral provided in one or more embodiments of the present disclosure.

FIG. 6 is a flowchart of interrupt coalescing and interrupt request of a hardware peripheral. FIG. 6 shows that a minimum interrupt interval register interface for acquiring a minimum interrupt interval and an event read register interface for a server system to read a hardware event are configured in a hardware device. A real-time counting module, an interrupt coalescing module, other functional modules, a hardware event queue and an interrupt notification module are configured inside the hardware peripheral, wherein the timed counting module periodically updates the current time, and transmits the current time to the interrupt coalescing module; other functional modules determine in real time whether the current hardware peripheral satisfies a condition for generating interrupt information, and when an interrupt event operation is completed or another exception occurs, interrupt information is generated, the interrupt information is added to a hardware event queue in an event form, the queue length is recorded in real time, and the queue length is sent to the interrupt coalescing module; when the current time is received by the interrupt coalescing module, it is determined whether the current time condition satisfies that the current interrupt interval is greater than or equal to a minimum interval, and when the current interrupt interval is greater than or equal to the minimum interval, whether the hardware queue is non-empty is determined; when the hardware queue is non-empty, it is determined that an interrupt request needs to be sent to software at this time, and the last interrupt time in a counter is updated, so as to complete an interrupt coalescing process. Finally, an interrupt request is sent to the interrupt notification module, and after receiving an interrupt request signal generated by the interrupt coalescing module, the interrupt notification module sends the interrupt request signal to a corresponding interrupt controller in a server system, so as to complete the whole interrupt request process.

In this embodiment, a hardware peripheral acquires an interrupt event by means of a preset interrupt event receiving interface, generates interrupt information based on the interrupt event when the interrupt event is completed, adds the interrupt information to a preset hardware event queue in an event form, then determines whether a preset interrupt request signal sending rule is satisfied currently, and when the preset interrupt request signal sending rule is satisfied currently, generates an interrupt request signal, and sends the interrupt request signal to a kernel space of a server system, such that when a peripheral driver of the kernel space monitors the interrupt request signal, a target hardware event read from the hardware event queue is converted into a target software event and is written into a preset global event queue by means of the server system, and then the target software event read from the global event queue is forwarded to a corresponding target service process by means of a user space for processing. The hardware coalescing technique proposed in the present disclosure is explained in detail in this embodiment. This method abandons the method in the traditional solution which causes the server system to be frequently interrupted because the interrupt information generated each time is converted into an interrupt signal to be sent to the server system in the application of the interrupt technique. This method uses a minimum interrupt interval and a hardware event queue to complete the coalescing of the interrupt events, allowing for more rational use of the interrupt technique.

Figure 7:
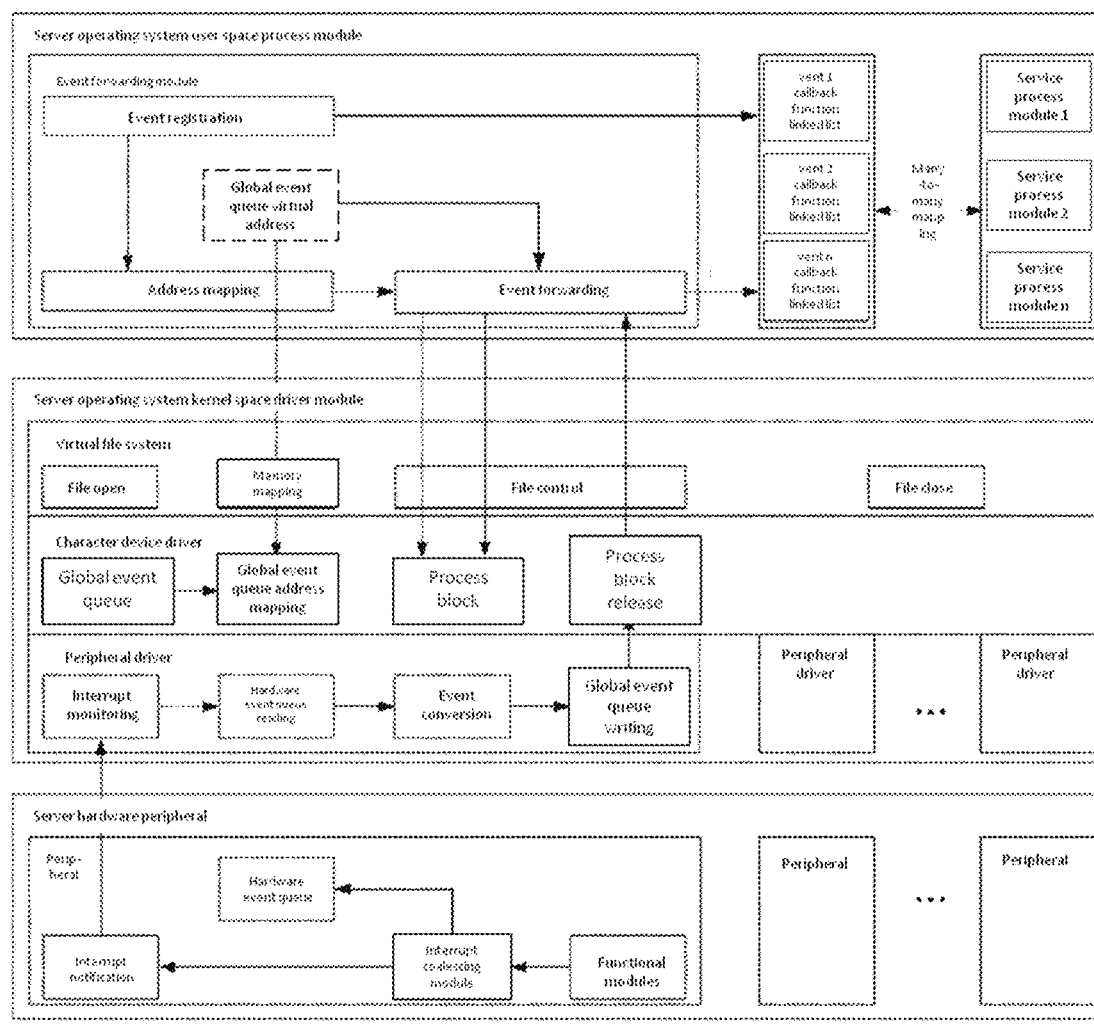
FIG. 7 is an overall flowchart of server system interrupt optimization provided in one or more embodiments of the present disclosure.

FIG. 7 is an overall flowchart of server system interrupt optimization proposed in the present disclosure. FIG. 7 shows an internal work flow of a user space process module, a kernel space process module and a server hardware peripheral of a server operating system. In the server hardware peripheral 1 at the lower part of FIG. 7, when a functional module generates interrupt information, the interrupt information is sent to an interrupt coalescing module; the interrupt coalescing module adds the interrupt information to a hardware event queue in an event format; and after the interrupt coalescing module generates an interrupt request, the interrupt request is sent to an interrupt notification module, and finally, the interrupt notification module sends a corresponding interrupt request signal to the server operating system. After acquiring the interrupt request signal sent by the hardware peripheral, an interrupt monitoring module in a peripheral driver in a kernel driver of the server operating system reads an event queue in the hardware peripheral, converts a hardware event into a software event, and then writes the software event into a global event queue. Correspondingly, when an event is written in the global event queue, process blocking in a character device driver may be released. An event forwarding module registers an event in an initialization phase for completing the registration process of an event callback linked list and a service process, and the mapping of a virtual address, wherein the mapping process of the virtual address is specifically mapping a physical address of the global event queue in the character device driver to a virtual address in the event forwarding module by using a memory hardware interface of a virtual file system and the character device driver. Then the software event in the global event queue is read by means of the virtual address, a corresponding event callback function linked list is determined according to the software event, finally a service process module corresponding to the software event is determined by using the many-to-many mapping relationship between the linked list and the service process module, and the software event is forwarded to a corresponding service process module for event processing.

Figure 8:
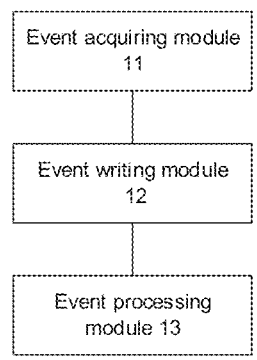
FIG. 8 is a schematic structural diagram of an apparatus for optimizing server system interrupts provided in one or more embodiments of the present disclosure.

As shown in FIG. 8, disclosed in the embodiments of the present disclosure is an apparatus for optimizing server system interrupts, wherein the apparatus is applied to a server system, and specifically may include:

an event acquiring module 11, configured to, when a peripheral driver of a kernel space monitors an interrupt request signal sent by a hardware peripheral, read a hardware event queue in the hardware peripheral, so as to acquire a target hardware event in the hardware event queue, wherein the interrupt request signal is a signal sent to the kernel space after being generated by the hardware peripheral upon determining that a preset interrupt request signal sending rule is satisfied;

an event writing module 12, configured to convert the target hardware event into a target software event by using the peripheral driver, and write the target software event into a preset global event queue; and an event processing module 13, configured to read the target software event in the global event queue by means of a user space, and forward the target software event to a corresponding target service process by means of the user space, such that the target service process processes the target software event.

In the present disclosure, when a peripheral driver of a kernel space monitors an interrupt request signal sent by a hardware peripheral, a hardware event queue in the hardware peripheral is read, so as to acquire a target hardware event in the hardware event queue, wherein the interrupt request signal is a signal sent to the kernel space after being generated by the hardware peripheral upon determining that a preset interrupt request signal sending rule is satisfied; the target hardware event is converted into a target software event by using the peripheral driver, and the target software event is written into a preset global event queue; a target software event in the global event queue is read by means of a user space, and the target software event is forwarded to a corresponding target service process by means of a user space, such that the target service process processes the target software event. In this way, after receiving the interrupt request signal generated by the hardware peripheral after the preset interrupt request signal sending rule is satisfied, a server system reads a target hardware event in the hardware peripheral, converts same into a target software event which may be processed by the system, and finally forwards the target software event in the user space to a target service process for processing. By means of hardware interrupt coalescing and software event coalescing techniques, this method may not only reduce the interrupt processing overhead, but also reduce the processor utilization.

In some particular embodiments, the apparatus for optimizing server system interrupts includes:

a process blocking unit, configured to set a semaphore mechanism for a character device driver of the kernel space, and set a current signal value of the character device driver as a signal value for representing that a current process state of the target service process is a blocked state; and a block releasing unit, configured to, when the character device driver detects that the target software event is written into the global event queue, switch the current signal value of the character device driver to a signal value for representing that the current process state is a non-blocked state, and then release the blocked state of the target service process.

In some particular embodiments, the method for optimizing server system interrupts includes:

a kernel event sending unit, configured to send, by using the character device driver, to the user space a kernel event for representing that the blocked state of the target service process is released;

correspondingly, the event acquiring module 11 further includes:

a kernel event acquiring unit, configured to receive, by means of the user space, the kernel event sent by the character device driver, and then read the target software event in the global event queue.

In some particular embodiments, the event processing module 13 includes:

a type determining unit, configured to determine a target event type of the target software event;

a linked list determining unit, configured to determine, based on a preset correlation between an event type and an event callback function linked list, a target event callback function linked list corresponding to the target software event by using the target event type; and a process determining unit, configured to determine the corresponding target service process by using the target event callback function linked list, and forward the target software event to the target service process, such that the target service process processes the target software event.

In some particular embodiments, the event processing module 13 includes:

an address acquiring unit, configured to acquire a physical address of the global event queue in the character device driver;

an address mapping unit, configured to map the physical address to the user space to obtain a corresponding virtual address of the global event queue; and an event reading unit, configured to read the target software event in the global event queue by means of the user space and by using the virtual address of the global event queue.

Figure 9:
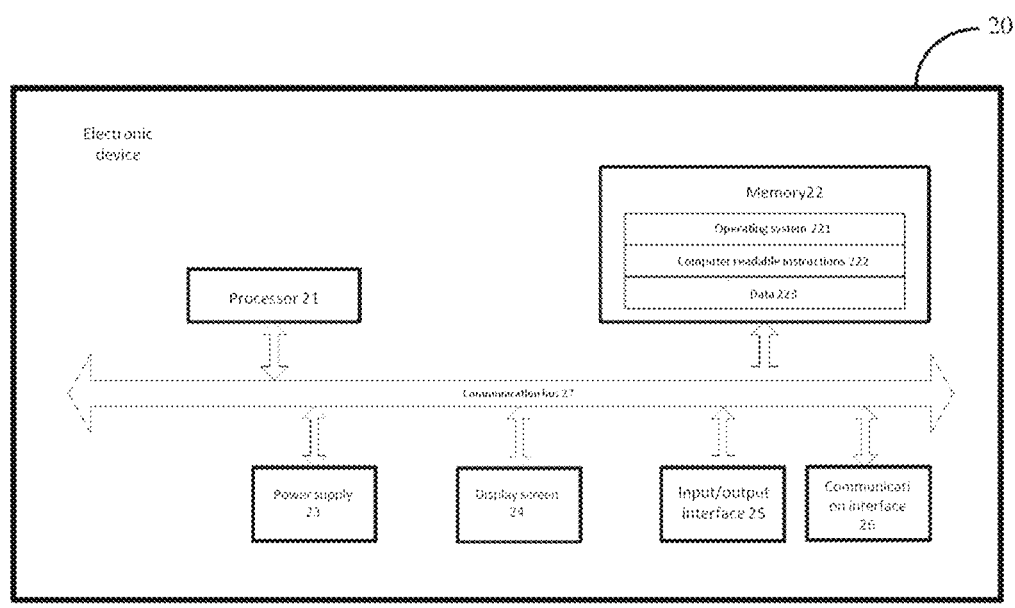
FIG. 9 is a structural diagram of an electronic device provided in one or more embodiments of the present disclosure.

Further, further disclosed in the embodiments of the present disclosure is an electronic device. FIG. 9 is a structural diagram of an electronic device 20 according to an exemplary embodiment. The content in FIG. 9 may not be considered as any limitation to the application scope of the present disclosure.

FIG. 9 is a schematic structural diagram of an electronic device 20 provided in an embodiment of the present disclosure. The electronic device 20 may specifically include: at least one processor 21, at least one memory 22, a power supply 23, a display screen 24, an input/output interface 25, a communication interface 26, and a communication bus 27. The memory 22 is configured to store computer readable instructions, wherein the computer readable instructions are loaded and executed by the processor 21, so as to implement relevant operations in the method for optimizing server system interrupts disclosed in any one of the foregoing embodiments. In addition, the electronic device 20 in this embodiment may specifically be an electronic computer.

In this embodiment, the power supply 23 is configured to provide a working voltage for each hardware device on the electronic device 20; the communication interface 26 may establish a data transmission channel between the electronic device 20 and an external device, and a communication protocol followed thereby is any communication protocol that may be applied to the technical solution of the present disclosure, which is not specifically limited herein; and the input/output interface 25 is configured to acquire external input data or to output data externally, and the specific interface type thereof may be selected according to specific application requirements, which is not specifically limited herein.

In addition, the memory 22, as a carrier for resource storage, may be a read-only memory, a random access memory, a magnetic disk or an optical disk, etc., resources stored on the memory 22 may include an operating system 221, computer readable instructions 222, etc., and the storage manner of the resources may be temporary storage or permanent storage.

The operating system 221 is configured to manage and control each hardware device on the electronic device 20 and the computer readable instructions 222, which may be Windows Server, Netware, Unix, Linux, etc. The computer readable instructions 222 may further include computer readable instructions that may be used to perform other specific tasks, in addition to the computer readable instructions that may be used to accomplish the method for optimizing server system interrupts performed by the electronic device 20 as disclosed in any of the foregoing embodiments.

Further, further disclosed in the present disclosure is a non-transitory computer readable storage medium storing one or more computer readable instructions. The computer readable storage medium herein includes a Random Access Memory (RAM), a memory, a Read-Only Memory (ROM), an electrically programmable ROM, an electrically erasable programmable ROM, a register, a hard disk, a magnetic disk or an optical disk or any other form of storage medium known in the art. The computer readable instructions, when executed by a processor, implement the method for optimizing server system interrupts disclosed above. For specific operations of the method, reference may be made to corresponding content disclosed in the foregoing embodiment, and details are not described herein again.

The embodiments in this description are described in a progressive manner. Each embodiment focuses on a part different from other embodiments. For the same or similar parts among the embodiments, reference may be made to each other. As the apparatus disclosed in the embodiments corresponds to the method disclosed in the embodiments, the description of the apparatus is relatively simple, and for the related parts, reference may be made to the description of the method. A person skilled in the art may further appreciate that, units and algorithm operations in the examples described in conjunction with the embodiments disclosed herein may be implemented by electronic hardware, computer software, or a combination of the two. To clearly describe the interchangeability between the hardware and the software, the foregoing has generally described compositions and operations of each example according to functions. Whether the functions are executed by hardware or software depends on specific applications and design constraint conditions of the technical solutions. A person skilled in the art may use different methods to implement the described functions for each specific application, but such implementation shall not be considered as going beyond the scope of the present disclosure.

The operations of a method or algorithm described in conjunction with the embodiments disclosed herein may be embodied directly in hardware, in a software module executed by a processor, or in a combination of the two. The software module may be placed in a random access memory (RAM), a memory, a read-only memory (ROM), an electrically programmable ROM, an electrically erasable programmable ROM, a register, a hard disk, a removable magnetic disk, CD-ROM, or any other form of storage medium known in the art.

Finally, it should be noted that, in this description, relationship terms such as first and second are merely used to distinguish one entity or operation from another entity or operation, and do not necessarily require or imply any actual relationship or sequence between these entities or operations. Furthermore, the terms "include" and "contain", or any other variant thereof are intended to cover a non-exclusive inclusion, such that a process, a method, an article, or a device that includes a series of elements not only includes those elements, but also includes other elements that are not explicitly listed, or further includes elements inherent to the process, the method, the article, or the device. Without more limitations, an element limited by "include a . . . " does not exclude other same elements also existing in a process, a method, an article, or a device that includes the element.

The foregoing describes in detail a method and an apparatus for optimizing server system interrupts, a device and a storage medium provided in the present disclosure. Specific examples are used therein to describe principles and implementations of the present disclosure. The description of the described embodiments is merely used to help understand the method and core idea of the present disclosure. Meanwhile, a person of ordinary skill in the art may make modifications to the specific implementations and application scopes according to the idea of the present disclosure. In conclusion, the content of the description shall not be construed as a limitation to the present disclosure.

The invention claimed is:

1. A method for optimizing server system interrupts, wherein the method is applied to a server system, and comprises:
    when a peripheral driver of a kernel space monitors an interrupt request signal sent by a hardware peripheral, reading a hardware event queue in the hardware peripheral, so as to acquire a target hardware event in the hardware event queue, wherein the interrupt request signal is a signal sent to the kernel space after being generated by the hardware peripheral upon determining that a preset interrupt request signal sending rule is satisfied;
    converting the target hardware event into a target software event by using the peripheral driver, and writing the target software event into a preset global event queue; and
    reading the target software event in the global event queue by means of a user space, and forwarding the target software event to a corresponding target service process by means of the user space, such that the target service process processes the target software event.

2. The method for optimizing server system interrupts according to claim 1, wherein the method further comprises:

setting a semaphore mechanism for a character device driver of the kernel space, and setting a current signal value of the character device driver as a signal value for representing that a current process state of the target service process is a blocked state;

correspondingly, after writing the target software event into the preset global event queue, the method further comprises:

when the character device driver detects that the target software event is written into the global event queue, switching the current signal value of the character device driver to a signal value for representing that the current process state is a non-blocked state, and then releasing the blocked state of the target service process.

3. The method for optimizing server system interrupts according to claim 2, wherein after setting the semaphore mechanism for the character device driver of the kernel space, and setting the current signal value of the character device driver as the signal value for representing that the current process state is the blocked state, the method further comprises:

calling a file control interface of the character device driver of the kernel space, and blocking, by means of the semaphore mechanism, the running of an event forwarding module of the user space according to the signal value for representing that the current process state is the blocked state, such that the event forwarding module is switched into a blocked state for waiting event;

wherein the event forwarding module is used for reading the target software event, and forwarding the target software event to the corresponding target service process;

when the character device driver detects that the target software event is written into the global event queue, switching the signal value of the current character device driver to the signal value for representing that the current process state is the non-blocked state, and then releasing the blocked state of the target service process comprise:

when the character device driver detects that the target software event is written into the global event queue, switching the current signal value of the character device driver to the signal value for representing that the current process state is the non-blocked state, and releasing the blocked state of the event forwarding module according to the signal value for representing that the current process state is the non-blocking state, such that the event forwarding module reads the target software event, and forwards the target software event to the corresponding target service process.

4. The method for optimizing server system interrupts according to claim 3, wherein after releasing the blocked state of the event forwarding module according to the signal value for representing that the current process state is the non-blocking state, the method further comprises:

after the event forwarding module completes the forwarding of all software event information of the target software event, re-calling the file control interface of the character device driver of the kernel space, and re-controlling, by means of the semaphore mechanism, the event forwarding module to enter the blocked state.

5. The method for optimizing server system interrupts according to claim 2, wherein after releasing the blocked state of the target service process, the method further comprises:

sending, by using the character device driver, to the user space a kernel event for representing that the blocked state of the target service process is released;

correspondingly, reading the target software event in the global event queue by means of the user space comprises:

receiving, by means of the user space, the kernel event sent by the character device driver, and then reading the target software event in the global event queue.

6. The method for optimizing server system interrupts according to claim 2, wherein a signal value of 0 in the character device driver indicates that the current process state is the blocked state, and a signal value of 1 indicates that the current process state is the non- blocked state.

7. The method for optimizing server system interrupts according to claim 1, wherein forwarding the target software event to a corresponding target service process, such that the target service process processes the target software event comprises:

determining a target event type of the target software event;

determining, based on a preset correlation between an event type and an event callback function linked list, a target event callback function linked list corresponding to the target software event by using the target event type; and determining the corresponding target service process by using the target event callback function linked list, and forwarding the target software event to the target service process, such that the target service process processes the target software event.

8. The method for optimizing server system interrupts according to claim 7, wherein the method further comprises:

registering event callback functions of one or more service processes in the event callback function linked list; and generating the preset correlation between the event type and the event callback function linked list after registration.

9. The method for optimizing server system interrupts according to claim 8, wherein the preset correlation between the event callback function linked list and the service process is a many-to-many mapping relationship.

10. The method for optimizing server system interrupts according to claim 1, wherein converting the target hardware event into a target software event comprises:

converting hardware event information of the target hardware event into software event information of the target software event.

11. The method for optimizing server system interrupts according to claim 10, wherein the hardware event information comprises operation completion information, operation exception information, and other exception information except the operation exception information, and the software event information comprises one or more of a total information length, an event type, a priority, whether to broadcast, whether to shield, a check algorithm, hardware event data and a check field.

12. The method for optimizing server system interrupts according to claim 1, wherein the reading the target software event in the global event queue by means of the user space comprises:

acquiring a physical address of the global event queue in the character device driver;

mapping the physical address to the user space to obtain a corresponding virtual address of the global event queue; and reading the target software event in the global event queue by means of the user space and by using the virtual address of the global event queue.

13. A method for optimizing server system interrupts, wherein the method is applied to a hardware peripheral, and comprises:

acquiring an interrupt event by means of a preset interrupt event receiving interface, and generating interrupt information based on the interrupt event when the interrupt event is completed;

adding the interrupt information to a preset hardware event queue in an event form; and determining whether a preset interrupt request signal sending rule is satisfied currently, and when the preset interrupt request signal sending rule is satisfied, generating an interrupt request signal, and sending the interrupt request signal to a kernel space of a server system, such that when a peripheral driver of the kernel space monitors the interrupt request signal, a target hardware event read from the hardware event queue is converted into a target software event, and the target software event is written into a preset global event queue by means of the server system, and then the target software event read from the global event queue is forwarded to a corresponding target service process by means of a user space for processing.

14. The method for optimizing server system interrupts according to claim 13, wherein the interrupt event is a hardware operation event, and generating interrupt information based on the interrupt event when the interrupt event is completed comprises:

after the hardware peripheral completes a corresponding hardware operation, generating corresponding interrupt information.

15. The method for optimizing server system interrupts according to claim 13, wherein generating interrupt information based on the interrupt event when the interrupt event is completed comprises:

when a device exception of the hardware peripheral or an operation exception of a hardware operation corresponding to the interrupt event occurs, generating corresponding interrupt information.

16. The method for optimizing server system interrupts according to claim 13, wherein determining whether a preset interrupt request signal sending rule is satisfied currently, and when the preset interrupt request signal sending rule is satisfied, generating the interrupt request signal comprise:

calculating a time difference between the current time and the last time when the interrupt request is sent, and taking the time difference as a current interrupt interval;

determining whether the current interrupt interval is not less than a preset minimum interrupt interval;

when the current interrupt interval is not less than the minimum interrupt interval, determining whether the hardware event queue is not empty; and when the hardware event queue is not empty, generating the interrupt request signal.

17. The method for optimizing server system interrupts according to claim 16, wherein after generating the interrupt request signal, the method further comprises:

sending the interrupt request signal, and updating the last interrupt event.

18. An electronic device, comprising a memory and one or more processors, wherein the memory stores computer readable instructions, and the computer readable instructions, when executed by the one or more processors, cause the one or more processors to execute the operations of the method according to anyone claim 1.

19. A non-transitory computer readable storage medium storing one or more computer readable instructions, wherein the computer readable instructions, when executed by one or more processors, cause the one or more processors to execute the operations of the method according to claim 1.

20. An electronic device, comprising a memory and one or more processors, wherein the memory stores computer readable instructions, and the computer readable instructions, when executed by the one or more processors, cause the one or more processors to execute the operations of the method according to claim 13.

* * * * *